United States Patent
Ha et al.

(10) Patent No.: US 10,029,231 B2
(45) Date of Patent: Jul. 24, 2018

(54) ORGANIC-INORGANIC HYBRID NANOPOROUS SILICA MATERIAL AND METHOD FOR PREPARING SAME

(71) Applicant: PUSAN NATIONAL UNIVERSITY INDUSTRY-UNIVERSITY COOPERATION FOUNDATION, Busan (KR)

(72) Inventors: Chang Sik Ha, Daejeon (KR); Mathew Aneesh, Busan (KR); Sung Soo Park, Busan (KR); Parambadath Surendran, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 0 days.

(21) Appl. No.: 15/511,797

(22) PCT Filed: Sep. 9, 2015

(86) PCT No.: PCT/KR2015/009482
§ 371 (c)(1),
(2) Date: Mar. 16, 2017

(87) PCT Pub. No.: WO2016/043470
PCT Pub. Date: Mar. 24, 2016

(65) Prior Publication Data
US 2017/0259242 A1    Sep. 14, 2017

(30) Foreign Application Priority Data

Sep. 16, 2014 (KR) .......................... 10-2014-0122494

(51) Int. Cl.
| | | |
|---|---|---|
| *B01J 20/22* | (2006.01) | |
| *B01J 20/10* | (2006.01) | |
| *B01J 20/32* | (2006.01) | |
| *B01J 20/28* | (2006.01) | |
| *C02F 1/28* | (2006.01) | |
| *C02F 101/20* | (2006.01) | |
| *C02F 103/08* | (2006.01) | |

(52) U.S. Cl.
CPC ............ *B01J 20/103* (2013.01); *B01J 20/22* (2013.01); *B01J 20/28064* (2013.01); *B01J 20/28083* (2013.01); *B01J 20/3204* (2013.01); *B01J 20/3217* (2013.01); *B01J 20/3261* (2013.01); *C02F 1/28* (2013.01); *C02F 2101/203* (2013.01); *C02F 2103/08* (2013.01)

(58) Field of Classification Search
CPC .... B01J 20/22; B01J 20/103; B01J 20/28064; C02F 1/28
USPC ........................................................ 502/401
See application file for complete search history.

(56) References Cited

U.S. PATENT DOCUMENTS

| | | | |
|---|---|---|---|
| 8,969,241 | B2 | 3/2015 | Ha et al. |
| 2013/0303766 | A1 | 11/2013 | Ha et al. |
| 2014/0261466 | A1 | 9/2014 | Yamanoi et al. |
| 2014/0287235 | A1 | 9/2014 | Chang et al. |

FOREIGN PATENT DOCUMENTS

| | | |
|---|---|---|
| JP | 2013-081912 | 5/2013 |
| KR | 10-2004-0054346 | 6/2004 |
| KR | 10-2009-0087330 | 8/2009 |
| KR | 10-2013-0020745 | 2/2013 |
| KR | 10-2013-0125958 | 11/2013 |

OTHER PUBLICATIONS

International Search Report for corresponding International PCT Application No. PCT/KR2015/009482, dated Nov. 16, 2015.
Pal, P. et al., "Fluorescence Sensing of Zinc(II) Using Ordered Mesoporous Silica Material (MCM-41) Fuctionalized with N-(Quinolin-8-yi)-2-[3-(triethoxysilyl)propylamino] acetamide", ACS Appl. Mater. & Interfaces, Jan. 18, 2011, vol. 3, N2, pp. 279-286.

*Primary Examiner* — Edward Johnson
(74) *Attorney, Agent, or Firm* — Hauptman Ham, LLP

(57) ABSTRACT

The present invention relates to an organic-inorganic hybrid nanoporous silica material having high selectivity to particular metal ions, and a method for preparing the same. Specifically, the present invention provides an organic-inorganic hybrid nanoporous silica material and a method for preparing the same, wherein the organic-inorganic hybrid nanoporous silica material has a closed pore form by capturing a functionalized silane compound in a nanoporous silica material, which is surface-modified with a functionalized silane compound, using a cyclic molecule, and enables the sensing and highly selective adsorption of various metals due to the incorporation of an organic ligand capable of adsorbing metal ions in pores.

14 Claims, 14 Drawing Sheets

| Reagent | | Concentration (g/L) |
|---|---|---|
| Sodium chloride | NaCl | 24.32 |
| Magnesium chloride | $MgCl_2$ | 5.14 |
| Calcium chloride | $CaCl_2$ | 1.14 |
| Potassium chloride | KCl | 0.69 |
| Sodium bicarbonate | $NaHCO_3$ | 0.2 |
| Potassium bromide | KBr | 0.1 |
| Boric acid | $H_3BO_3$ | 0.027 |
| Strontium chloride | $SrCl_2$ | 0.026 |
| Ammonium chloride | $NH_4Cl$ | 0.0064 |
| Sodium fluoride | NaF | 0.003 |
| Sodium Silicate | $NaSiO_3$ | 0.002 |
| Iron (III) Phosphate | $FePO_4$ | 0.001 |

ORGANIC-INORGANIC HYBRID NANOPOROUS SILICA MATERIAL AND METHOD FOR PREPARING SAME

TECHNICAL FIELD

The present invention relates to an organic-inorganic hybrid nanoporous silica material having high selectivity to particular metal ions, and a method for preparing the same.

BACKGROUND ART

Seawater and factory wastewater have a bad influence on the human body because they include large amounts of heavy metals and organic or inorganic pollutants. In addition, environmental pollution problems are getting worse due to various harmful materials caused by recent development of industrial fields and high growth, and thus, an agent for treating the harmful materials is required to be developed.

A chelate ion-exchange resin, an activated carbon, an acrylamide polymer fiber, etc., are widely used for adsorption of metal ions from an aqueous solution. Among these methods, the chelating method is mainly used in separation and concentration systems.

Among strategic rare metals (lithium, cobalt, molybdenum, manganese, tungsten, titanium, magnesium, indium, rare earth, chromium and nickel) that are of interest as a part of securing resources by the government currently, nickel is widely and mainly used for manufacturing secondary batteries and special steels, and it is an important rare metal that has received attention as a metal that is absolutely necessary for Korea's core industries at present. However, the nickel is mostly and currently imported in Korea.

Therefore, it is significantly important to separate and concentrate nickel as a high-value-added resource in consideration of the fact that Korea lacks natural resources. Nanoporous silica materials having high surface area and nano pores are potential candidates for the separation and concentration of nickel.

The nanoporous silica materials are generally synthesized using a monomolecular surfactant or a polymer material having hydrophilic and hydrophobic moieties as a template, and using an inorganic material based on silica as a pore wall forming material, through a self-assembly phenomenon in an aqueous solution. The nanoporous silica material began to be synthesized for the first time in 1992 by Beck and co-researchers (Beck, J. S.; Vartuli, C.; Roth, W. J.; Leonowicz, M. E.; Kresge, C. T.; Schmitt, K. D.; Chu, C. T-W.; Olson, D. H.; Sheppard, E. W.; McCullen, S. B.; Higgins, J. B.; Schlenker, J. L. J. Am. Chem. Soc., 1992a, 114, 10834, and Kresge, C. T.; Leonowicz, M. E.; Roth, W. J.; Vartuli, J. C.; Beck, J. S. Nature, 1992, 359, 710), and many studies have been conducted.

In addition, the nanoporous silica material has many silanol groups (Si—OH) present on surfaces of pores. Therefore, alkoxysilane having an organic functional group may be modified through a chemical reaction. These modified nanoporous silica materials have regular pore arrangements, uniform pore size, and high surface area, thereby selectively adsorbing macromolecules, enzymes, and metal ions to have significantly high applicability to specific catalytic reactions, sensors, drug delivery, and production of nanomaterials, etc. Meanwhile, nanoporous silica materials without pore surface modification exhibit poor selectivity to the above-described macromolecules, enzymes and metal ions, and exhibit low adsorptivity.

Therefore, the present inventors found that when a pore surface of the nanoporous silica material was modified with a functionalized silane compound, an organic ligand having high selectivity to metal ions was incorporated in pores, and then, the functionalized silane compound was collected using a cyclic molecule, and thus, an organic-inorganic hybrid nanoporous silica material having a closed pore form could be synthesized, and the metal ions could be adsorbed and separated with high selectivity from seawater or wastewater by using this organic-inorganic hybrid nanoporous silica material, and completed the present invention.

DISCLOSURE

Technical Problem

An object of the present invention is to provide an organic-inorganic hybrid nanoporous silica material having a closed pore form capable of adsorbing and separating particular metal ions with high selectivity, and a method for preparing the same.

Technical Solution

In one general aspect, there is provided an organic-inorganic hybrid nanoporous silica material for adsorbing metal ions which has a closed pore form by capturing a functionalized silane compound in a nanoporous silica material, which is surface-modified with the functionalized silane compound, using a cyclic molecule, and includes an organic ligand capable of adsorbing metal ions incorporated in pores.

The cyclic molecule may be cyclodextrin, crown ether, cyclopropane pseudorotaxane, bistable rotaxane, cucurbit uril or a derivative thereof.

The organic ligand may be cryptand, crown ether, porphyrin, or a derivative thereof.

The metal ion may be at least one selected from the group consisting of a lithium ion, an iron ion, a copper ion, a cobalt ion, and a nickel ion.

The organic-inorganic hybrid nanoporous silica material may have a pore arrangement of a hexagonal structure, a cubic struccture, a layered structure or a disordered structure.

The organic-inorganic hybrid nanoporous silica material having the pore arrangement may have an average pore diameter of 2 to 30 nm and a surface area of 500 to 1000 $m^2/g$.

In another general aspect, there is provided an adsorbent having selective adsorptivity to metal ions, including the organic-inorganic hybrid nanoporous silica material as described above.

The adsorbent may selectively adsorb and separate nickel ions ($Ni^{2+}$).

In still another general aspect, there is provided a method for preparing an organic-inorganic hybrid nanoporous silica material including: surface-modifying a pore wall surface of a nanoporous silica material with a functionalized silane compound; and supporting an organic ligand capable of adsorbing metal ions in pores of the surface-modified nanoporous silica material, and introducing a cyclic molecule to form a closed pore form.

The functionalized silane compound may be mixed in an amount of 10 to 80 parts by weight based on 100 parts by weight of the nanoporous silica material.

The surface-modifying may be performed at a temperature ranging from 80 to 150° C.

The organic-inorganic hybrid nanoporous silica material prepared by the method for preparing an organic-inorganic hybrid nanoporous silica material may have a surface area of 500 to 1000 m²/g, and an average pore diameter of 2 to 30 nm.

In the method for preparing an organic-inorganic hybrid nanoporous silica material, the cyclic molecule may be mixed in an amount of 200 to 300 parts by weight based on 100 parts by weight of the surface-modified nanoporous silica material so that an opening part of the pores exposed on a surface has a closed pore form by the cyclic molecule.

Advantageous Effects

The organic-inorganic hybrid nanoporous silica material according to the present invention is capable of sensing and adsorbing various metals with high selectivity by introducing various organic ligands having high selectivity to various metals into nano pores without chemical bonding.

The organic-inorganic hybrid nanoporous silica material according to the present invention may provide an adsorbent having high selectivity to particular metal ions by coordinating metal ions with an organic ligand introduced into pores to form a metal complex, and thus, it is possible to sense and adsorb particular metal ions in an aqueous solution with high selectivity. In addition, the organic-inorganic hybrid nanoporous silica material has the closed pore form, and thus, the adsorbent including the metal complex may be easily separated from a solution.

In addition, a method for easily preparing the organic-inorganic hybrid nanoporous silica material according to the present invention at a high yield may be provided, and thus, it is possible to provide the preparation method with significantly excellent processability and economical efficiency.

BEST MODE

Figure 1:
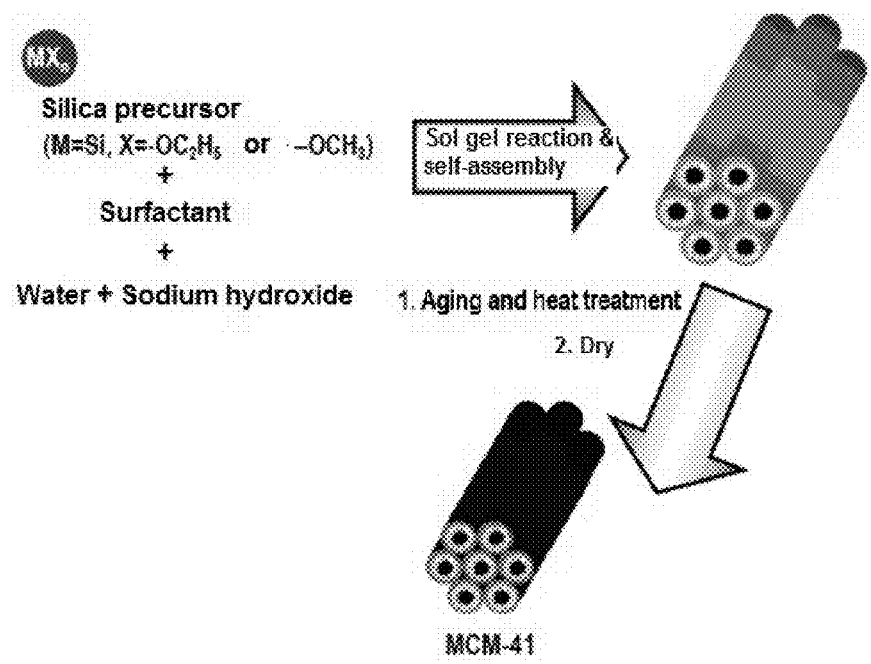
FIG. 1 is a schematic view of a process of synthesizing a nanoporous silica material.

Hereinafter, an organic-inorganic hybrid nanoporous silica material for adsorbing metal ions with high selectivity according to the present invention, and a method for preparing the same are described. Here, unless technical and scientific terms used herein are defined otherwise, they have meanings generally understood by those skilled in the art to which the present invention pertains. Known functions and components that may obscure the gist of the present invention with unnecessary detail will be omitted.

Terms used in the present specification are firstly described as below.

In the present invention, term "structure forming template" means a template used for forming a structure, "nano pore" means that an average diameter of pores is 2 to 30 nm, and "organic-inorganic hybrid nanoporous silica material" according to the present invention means a silica material capable of adsorbing metal ions with high selectivity by incorporating an organic ligand capable of adsorbing the metal ions in the pores.

In order to solve the above-described technical problem, the nanoporous silica material may be synthesized through a self-assembly method of reaction materials, specifically, by using a surfactant as the structure forming template and using a silica precursor as a pore wall constituent material, and is subjected to surface modification with a functionalized silane compound. Then, the functionalized silane compound may be collected by using a cyclic molecule that forms a cyclic donut structure, thereby forming a closed pore form.

Further, the nanoporous silica material may provide an organic-inorganic hybrid nanoporous silica material having high selectivity to metal ions by incorporating the organic ligand capable of adsorbing the metal ions in the pores.

The organic-inorganic hybrid nanoporous silica material and results of highly selective adsorption of nickel ions in a similar seawater (artificial seawater) condition or in an aqueous solution by using the organic-inorganic hybrid nanoporous silica material may be confirmed by X-ray diffraction, nitrogen isotherm adsorption/desorption, scanning electron microscopy, transmission electron microscopy, carbon and silicon solid state nuclear magnetic resonance spectra, infrared spectroscopy, or inductively coupled plasma atomic emission spectroscopy.

The functionalized silane compound used for the surface modification of the nanoporous silica material according to an exemplary embodiment of the present invention may include an aniline group, an amine group, an ammonium group, an adamantane group, a sulfonic acid group, a thiol group, an azobenzene group, a carboxylic acid group, and a disulfide group. In view of facilitation of capturing of the functionalized silane compound using the cyclic molecule, non-limiting examples of the functionalized silane compound may include at least one silane compound selected from the group consisting of N-[3-(trimethoxysilyl)propyl] aniline, N-[3-(triethoxysilyl)propyl]aniline, and N-[3-(triethoxysilyl)propyl]ammonium, but the functionalized silane compound is not limited thereto.

The cyclic molecule according to an exemplary embodiment of the present invention is a molecule having a cyclic donut structure. Non-limiting examples of the cyclic molecule may include cyclodextrin, crown ether, cyclopropane pseudorotaxane, bistable rotaxane, cucurbit uril or a derivative thereof. A specific example for forming stably closed pores when capturing the functionalized silane compound is preferably alpha-cyclodextrin (an inner pore diameter is 5.3 Å) or beta-cyclodextrin (an inner pore diameter is 6.5 Å).

The organic ligand according to an exemplary embodiment of the present invention is not limited as long as it is an organic ligand capable of adsorbing metal ions. Non-limiting examples of the organic ligand may include cryptand, crown ether, porphyrin, or a derivative thereof, and the cryptand is preferred in view of highly selective adsorption of nickel ions ($Ni^{2-}$ or $Ni^{2+}$).

Further, the organic-inorganic hybrid nanoporous silica material according to the present invention may have a pore arrangement of a hexagonal structure, a cubic struccture, a layered structure or a disordered structure.

Here, the organic-inorganic hybrid nanoporous silica material may have an average pore diameter of 2 to 30 nm and a surface area of 500 to 1000 $m^2/g$. Here, preferably, the nanoporous silica material may be a silica material having a pore arrangement of hexagonal or cubic structure in which an average pore diameter is 2 to 10 nm and a surface area is 700 to 900 $m^2/g$.

The present invention provides an adsorbent having selective adsorptivity to metal ions, including the organic-inorganic hybrid nanoporous silica material as described above.

The organic-inorganic hybrid nanoporous adsorbent may have selective adsorptivity to particular metal ions, and the particular metal ions may include lithium ion ($Li^+$), iron ion ($Fe^{2+}$ or $Fe^{3+}$), copper ion ($Cu^+$, $Cu^{2+}$ or $Cu^{3+}$), cobalt ion ($Co^{2+}$ or $Co^{3+}$), or nickel ion ($Ni^{2+}$ or $Ni^{3+}$). As a more specific example, the adsorbent is capable of adsorbing nickel ions ($Ni^{2+}$ or $Ni^{3+}$) with high selectivity and easily separating an adsorbed metal complex.

Figure 5:
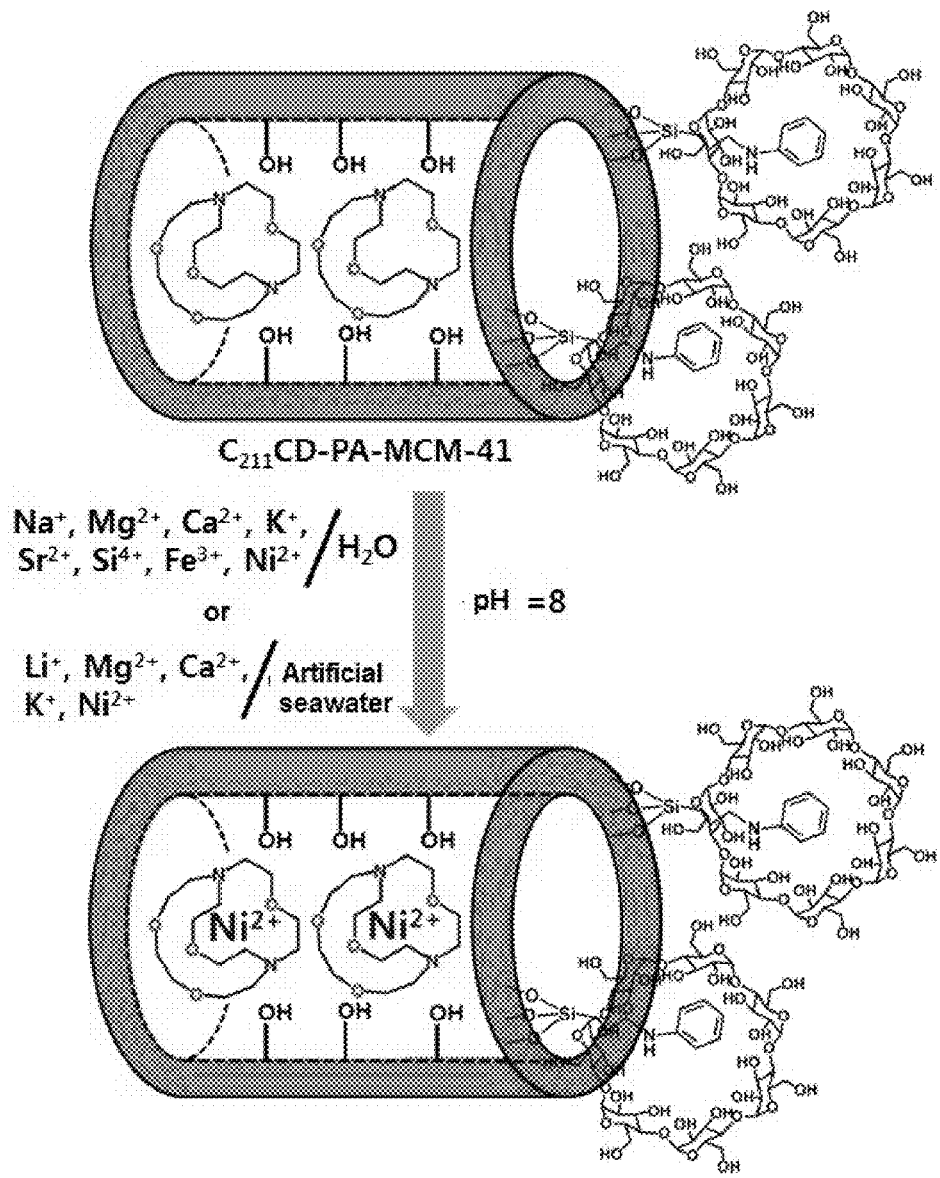
FIG. 5 is a schematic view showing a process for selectively adsorbing metal ions in an aqueous solution using the organic-inorganic hybrid nanoporous silica material ($C_{211}$CD-PA-MCM-41) according to Example 1.

Here, a non-limiting example in which nickel ions ($Ni^{2+}$) are selectively adsorbed by using the adsorbent including the organic-inorganic hybrid nanoporous silica material is schematically shown in FIG. 5.

The adsorbent according to the present invention may adsorb and separate nickel ions ($Ni^{2+}$) in a similar seawater (artificial seawater) condition or in an aqueous solution with high selectivity, by using the organic-inorganic hybrid nanoporous silica material in which an opening part of nano pores is surface-modified with a functionalized silane compound, a cyclic molecule is used as a stopper of the nano pores, and an organic ligand showing high selectivity to particular metal ions is included in pores.

Figures 11, 12:
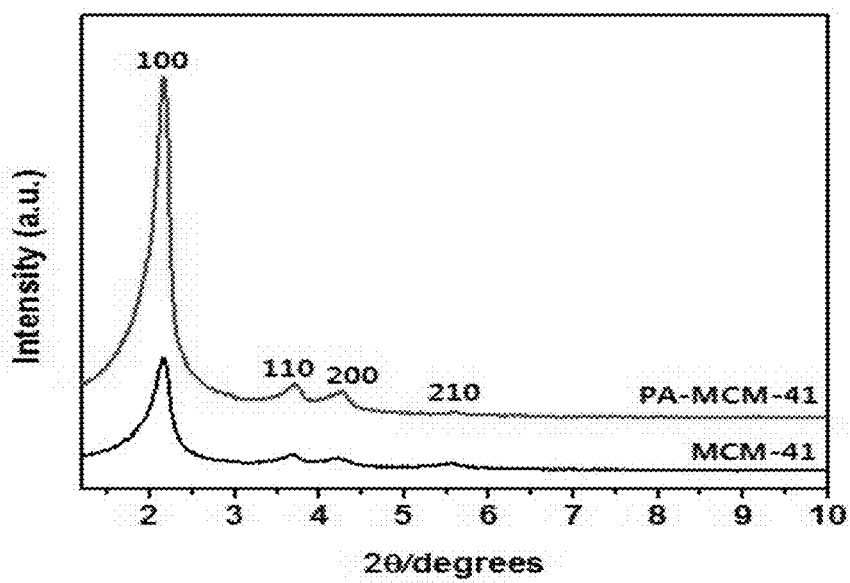
FIG. 11 shows reagents and concentrations for preparing the similar seawater (artificial seawater).
FIG. 12 shows x-ray diffraction patterns of the nanoporous silica material (MCM-41) and the surface-modified nanoporous silica material (PA-MCM-41) according to Example 1.

The similar seawater (artificial seawater) may have NaCl, $MgCl_2$, $CaCl_2$, KCl, $NaHCO_3$, KBr, $H_3BO_3$, $SrCl_2$, $NH_4Cl$, NaF, $Na_2SiO_3$, $FePO_4$, $Fe(NO_3)_3$, $Ni(NO_3)_2$, LiCl or a mixture thereof as a metal ion source (see FIG. 11).

The present invention provides a method for easily preparing an organic-inorganic hybrid nanoporous silica material for highly selective adsorption to metal ions by a simple process.

The method of the present invention may include surface-modifying a pore wall surface of a nanoporous silica material with a functionalized silane compound; and supporting an organic ligand capable of adsorbing metal ions in pores of the surface-modified nanoporous silica material, and introducing a cyclic molecule to form a closed pore form.

In the method for preparing an organic-inorganic hybrid nanoporous silica material according to the present invention, the functionalized silane compound may be an aniline group, an amine group, an ammonium group, an adamantane group, a sulfonic acid group, a thiol group, an azobenzene group, a carboxylic acid group, or a disulfide group. In view of facilitation of capturing of the functionalized silane compound using the cyclic molecule, non-limiting examples of the functionalized silane compound may include at least one silane compound selected from the group consisting of N-[3-(trimethoxysilyl)propyl]aniline, N-[3-(triethoxysilyl)propyl]aniline and N-[3-(triethoxysilyl)propyl]ammonium, but the present invention is not limited thereto.

Here, the functionalized silane compound may be mixed in an amount of 10 to 80 parts by weight based on 100 parts by weight of the nanoporous silica material, and may be preferably mixed in an amount of 15 to 50 parts by weight in order to facilitate the capturing of the functionalized silane compound using the cyclic molecule.

The surface-modifying step may be performed at a temperature ranging from 80 to 150° C., and may be preferably performed at a temperature ranging from 100 to 130° C. to shorten a reaction time.

The step of preparing the surface-modified nanoporous silica material or the organic-inorganic hybrid nanoporous silica material according to an exemplary embodiment of the present invention may further include drying each material at a temperature ranging from 40 to 100° C. for 10 to 100 hours after preparing each material.

In addition, the nanoporous silica material may be prepared by mixing a structure forming template with distilled water to prepare a mixed solution; and mixing the mixed solution with a silica precursor as a nanopore wall constituent material, followed by hydrothermal reaction.

Here, the silica precursor may be tetraethoxysilane, tetramethoxysilane, tetrachlorosilane, tetrabromosilane or a mixture thereof, but is not limited thereto, and the silica precursor may be used to form —Si—O—Si— bonds, and the structure forming template used to form the nano pores may be a cationic surfactant having at least 10 hydrophobic groups and an ammonium head group. Non-limiting examples of the structure forming template may include dodecyltrimethylammonium chloride, myristyltrimethylammonium chloride, cetyltrimethylammonium chloride, stearyltrimethylammonium chloride, arachyltrimethylammonium chloride, behenyltrimethylammonium chloride, cetyldimethylammonium chloride, stearyldimethylammonium chloride, arachyldimethylammonium chloride, behenyldimethylammonium chloride, cetyldiethylammonium chloride, stearyldiethylammonium chloride, arachyldiethylammonium chloride, behenyldiethylammonium chloride, benzyldimethylmyristylammonium chloride, benzyldimethylcetylammonium chloride, benzyldimethylstearylammonium chloride, benzyldimethylbehenylammonium chloride, benzyldimethylethylcetylammonium chloride, benzyldimethylethylstearylammonium chloride, distearyldimethylammonium chloride, dibehenyldihydroxyethylammonium chloride or corresponding bromide, but the present invention is not limited thereto.

The silica precursor may be mixed in an amount of 150 to 300 parts by weight based on 100 parts by weight of the cationic surfactant used as the structure forming template, and preferably, may be mixed in an amount of 200 to 300 parts by weight so that an average pore diameter is regularized to 2 to 30 nm.

As shown in FIG. 1, the nanoporous silica material according to an exemplary embodiment of the present invention may be prepared through sol-gel reaction and self-assembly process under base catalysts using the silica precursor as the pore wall forming material, and using the cationic surfactant as the structure forming template, followed by hydrothermal reaction.

The hydrothermal reaction is preferably performed at 80 to 100° C., and the base catalyst used herein is a material including a hydroxyl group. Non-limiting examples thereof may include sodium hydroxide or potassium hydroxide.

In addition, after the step of surface-modifying the pore wall surface of the nanoporous silica material prepared using the structure forming template, a step of removing the used structure forming template may be further included. Heat treatment or solvent extraction may be used to remove the structure forming template, but the present invention is not limited thereto.

Here, the heat treatment is preferably performed at 400 to 700° C., and a firing temperature may be appropriately controlled within the above-described range according to kinds of the structure forming material. Further, the solvent extraction may be performed using (C1-C3) alcohol, acetone, or a mixed solvent thereof. In order to increase an extraction efficiency of the structure forming template, the solvent extraction is preferably performed by adding acetic acid, hydrochloric acid, sulfuric acid, nitric acid, phosphoric acid, or a mixed organic acid thereof.

In addition, the organic-inorganic hybrid nanoporous silica material prepared by the preparation method according to the present invention may have a surface area of 500 to 1000 m$^2$/g. Here, preferably, the nanoporous silica material may be a silica material having a pore arrangement of hexagonal structure or cubic structure in which an average pore diameter is 2 to 10 nm and a surface area is 700 to 900 m$^2$/g.

In the preparation method, the cyclic molecule may be mixed in an amount of 200 to 300 parts by weight based on 100 parts by weight of the surface-modified nanoporous silica material, thereby forming the closed pore form in which the opening part of the pores exposed on the surface is closed by the cyclic molecule.

Figure 2:
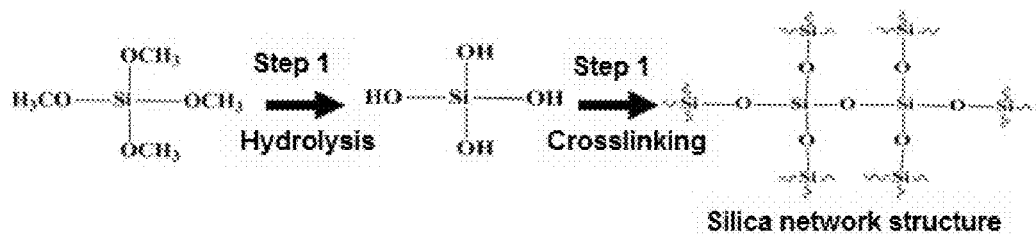
FIG. 2 is a schematic view showing a mechanism of nanoporous wall formation using a nanopore wall constituent material, trimethoxysilane.

A mechanism for preparing the silica material having nano pores using the silica precursor is shown in FIG. 2. As a non-limiting example, a silica material having a nanoporous network structure may be formed by a step of forming a silanol by hydrolysis from tetramethoxysilane which is the silica precursor (step 1 hydrolysis), and a step of forming —Si—O—Si— bonds and crosslinking by dehydration reaction between the silanols (step 1 crosslinking).

Figure 3:
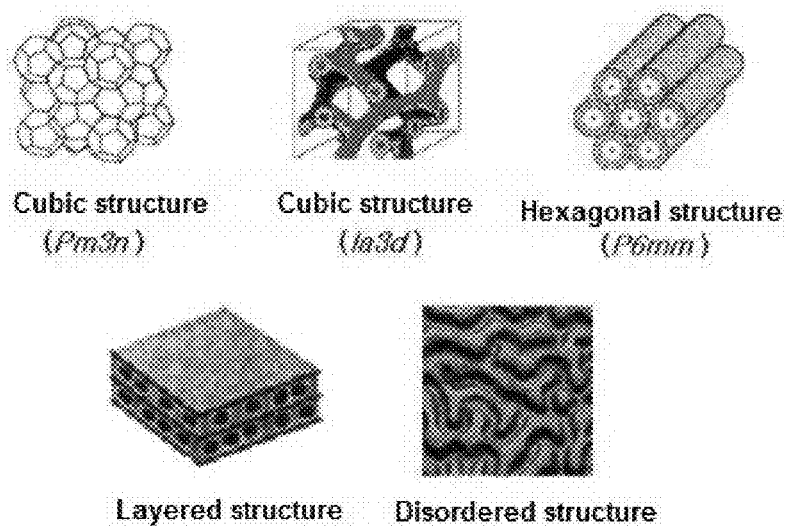
FIG. 3 shows a representative pore arrangement structure of the nanoporous silica material.

The nanoporous silica material prepared by the above-described method may have a pore arrangement of a hexagonal structure, a cubic structure, a layered structure or a disordered structure as shown in FIG. 3.

Figure 4:
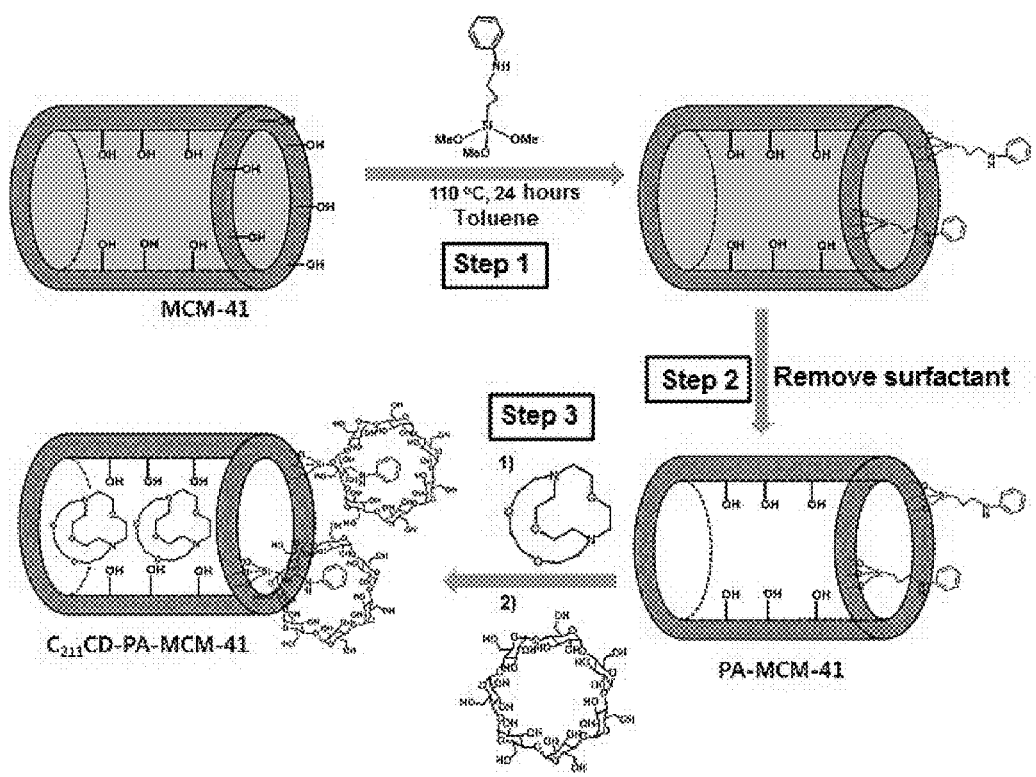
FIG. 4 is a schematic view showing a process of synthesizing an organic-inorganic hybrid nanoporous silica material according to an exemplary embodiment of the present invention.

An example of the method for preparing the organic-inorganic hybrid nanoporous silica material in which the opening part of nano pores is surface-modified with the functionalized silane compound, the cyclic molecule is used as a stopper of the nano pores, and an organic ligand having high selectivity to particular metal ions is included in pores, is schematically shown in FIG. 4.

As shown in FIG. 4, a silanol group (Si—OH) and a functionalized silane, (N-[3-(trimethoxysilyl)propyl]aniline) are reacted in the opening part of pores of a nanoporous silica material (MCM-41) to perform surface-modification for 24 hours in a toluene solution at 110° C. (FIG. 4—Step 1), followed by solvent extraction in a hydrochloric acid/ethanol solution, thereby removing the structure forming template in the pores (FIG. 4—Step 2). Cryptand having selectivity to nickel ions is incorporated in this sample, and then, beta-cyclodextrin is added to close the opening part of pores through interaction with the modified N-[3-(trimethoxysilyl)propyl]aniline functional group, thereby preparing the organic-inorganic hybrid nanoporous silica material having the closed pore form ($C_{211}$CD-PD-MCM-41, FIG. 4—Step 3).

An example for selective adsorption of metal ions in artificial seawater by using the organic-inorganic hybrid nanoporous silica material in which the opening part of nano pores is surface-modified with the functionalized silane compound, the cyclic molecule is used as a stopper of the nano pores, and an organic ligand having high selectivity to particular metal ions is included in pores, is schematically shown in FIG. 5.

As shown in FIG. 5, a target solution, i.e., an aqueous solution in which $Na^+$, $Mg^{2+}$, $Ca^{2+}$, $K^-$, $Sr^{2+}$, $Si^{4+}$, $Fe^{3+}$, and $Ni^{2+}$ ions are dissolved in water a concentration of $5\times10^{-4}$ M, respectively, or an artificial seawater in which $Li^+$, $Mg^{2+}$, $Ca^{2+}$, $K^-$, and $Ni^{2+}$ ions are dissolved at a concentration of $5\times10^{-4}$ M, respectively is added to an organic-inorganic hybrid nanoporous silica material ($C_{211}$CD-PD-MCM-41) in which the opening part of nano pores is modified with N-[3-(trimethoxysilyl)propyl]aniline, a beta-cyclodextrin molecule is used as the stopper of the nano pores, and the cryptand having high selectivity to the nickel ions in the pores is incorporated, and stirred at room temperature (20° C.) for 24 hours under pH=8, thereby adsorbing and separating the metal ions.

Hereinafter, the organic-inorganic hybrid nanoporous silica material having high selectivity to metal ions of the present invention, and the method for preparing the same are described with reference to specific Examples, but it is not intended to limit the scope of the claims of the present invention.

Example 1

Synthesis of Organic-Inorganic Hybrid Nanoporous Silica Material ($C_{211}$CD-PA-MCM-41)

A. Synthesis of Nanoporous Silica Material (MCM-41)

Figure 6:
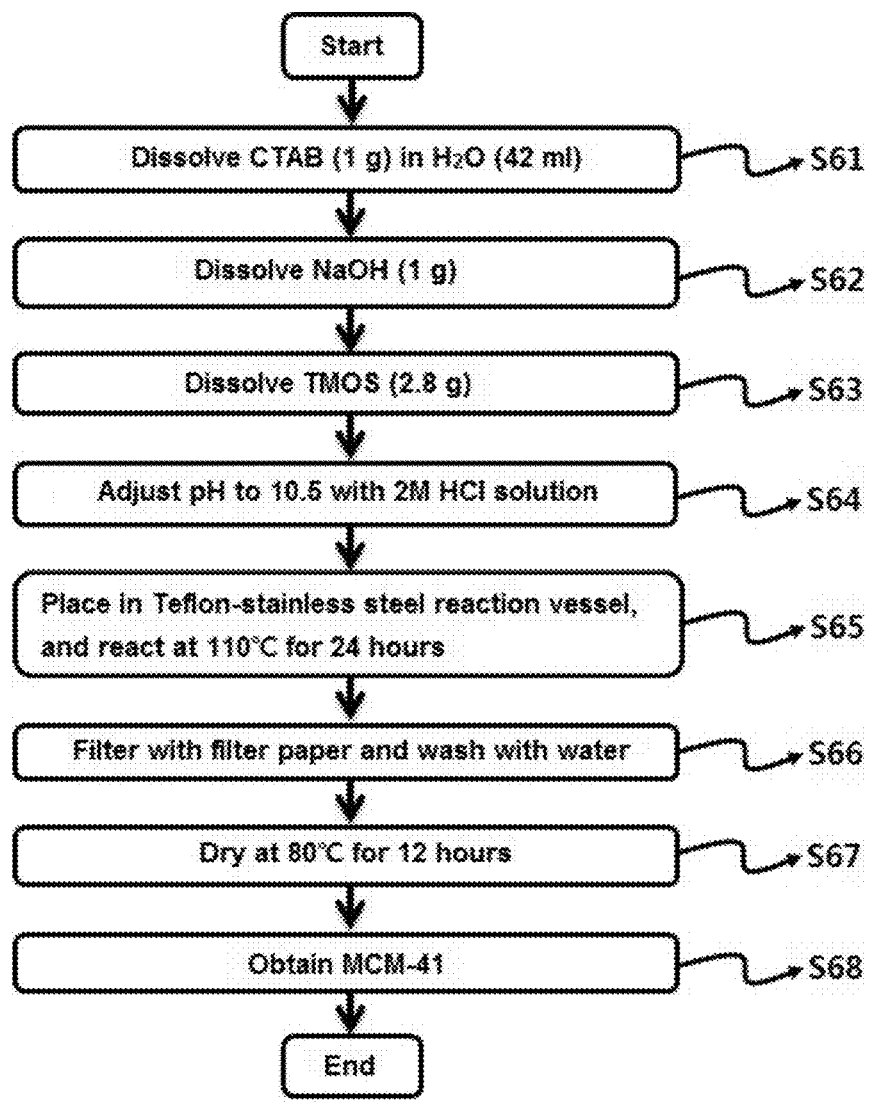
FIG. 6 is a flow chart showing a synthesis process of the nanoporous silica material (MCM-41) according to Example 1.

FIG. 6 is a flowchart showing a synthesis process of the nanoporous silica material having a pore arrangement of a regular hexagonal structure according to an exemplary embodiment of the present invention.

A surfactant (cetyltrimethylammonium bromide, CTAB) (1 g) was dissolved in water (42 ml) (Step S61). Then, sodium hydroxide (NaOH) (1 g) was added and dissolved (Step S62). Next, tetramethoxysilane (2.8 g) was added and dissolved (Step S63). In addition, pH of a reaction solution was controlled to 10.5 using a 2M aqueous hydrochloric acid solution (HCl) (Step S64). The reaction solution was placed in a Teflon-stainless steel reaction vessel and reacted at 110° C. for 24 hours (Step S65). After the reaction, the reaction solution was filtered with filter paper, and a filtered reaction product was washed with water (Step S66). The reaction product was dried at 80° C. for 12 hours (step S67) to obtain a nanoporous silica material (MCM-41) (Step S68).

Figure 7:
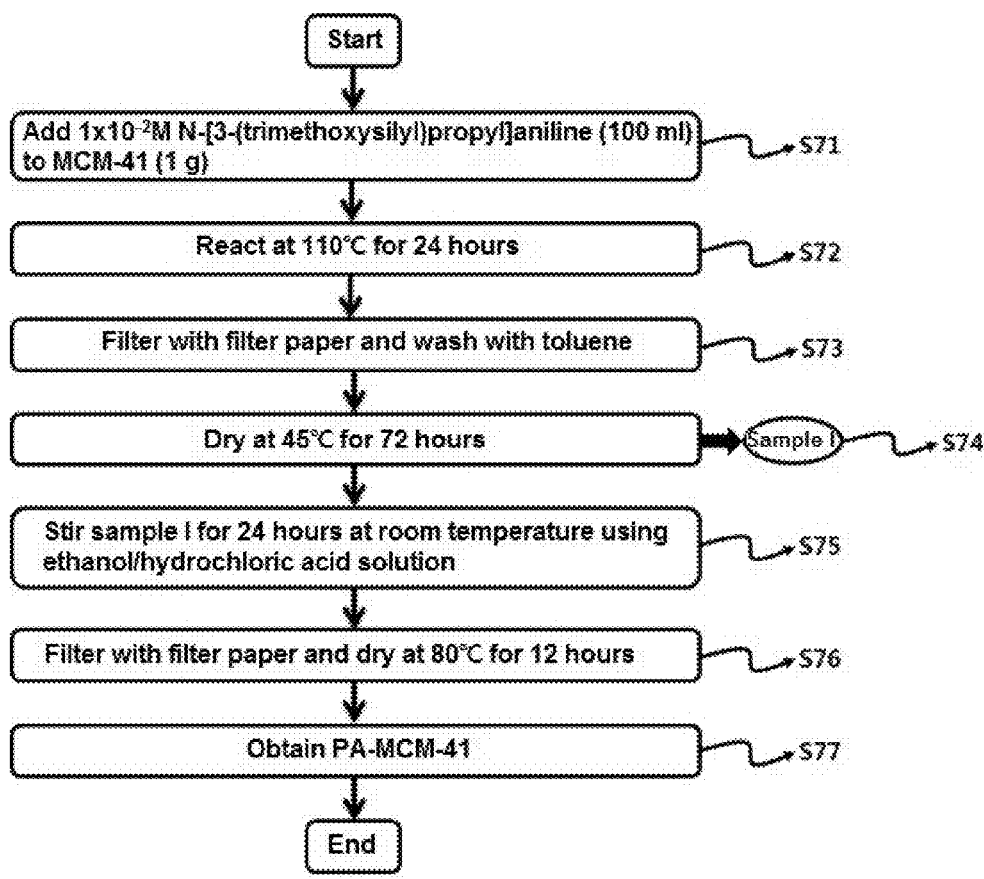
FIG. 7 is a flow chart showing a synthesis process of a surface-modified nanoporous silica material (PA-MCM-41) according to Example 1.

B. Synthesis of Nanoporous Silica Material (PA-MCM-41) which is Surface-Modified with N-[3-(trimethoxysilyl)propyl]aniline FIG. 7 is a flow chart showing a synthesis process of a nanoporous silica material which is surface-modified with N-[3-(trimethoxysilyl)propyl]aniline according to an exemplary embodiment of the present invention.

N-[3-(trimethoxysilyl)propyl]aniline (100 ml) having a concentration of $1\times10^{-2}$M was mixed with the nanoporous silica material (MCM-41) (1 g) (Step S71). Then, the reaction solution was reacted at 110° C. for 24 hours (Step S72). After the reaction, the reaction solution was filtered with filter paper, and a filtered reaction product was washed with toluene (Step S73). The reaction product was dried at 45° C. for 72 hours to obtain a sample I (Step S74).

The sample I (1 g) was stirred for 24 hours at room temperature (20° C.) using an ethanol/hydrochloric acid solution (153 ml, specifically, ethanol/hydrochloric acid=150 ml/3 ml) (Step S75) and filtered with filter paper, and a filtered reaction product was dried at 80° C. for 12 hours (Step S76) to obtain a nanoporous silica material (PA-MCM-41) which was surface-modified with an aniline-functionalized silane compound (Step S77).

Figure 8:
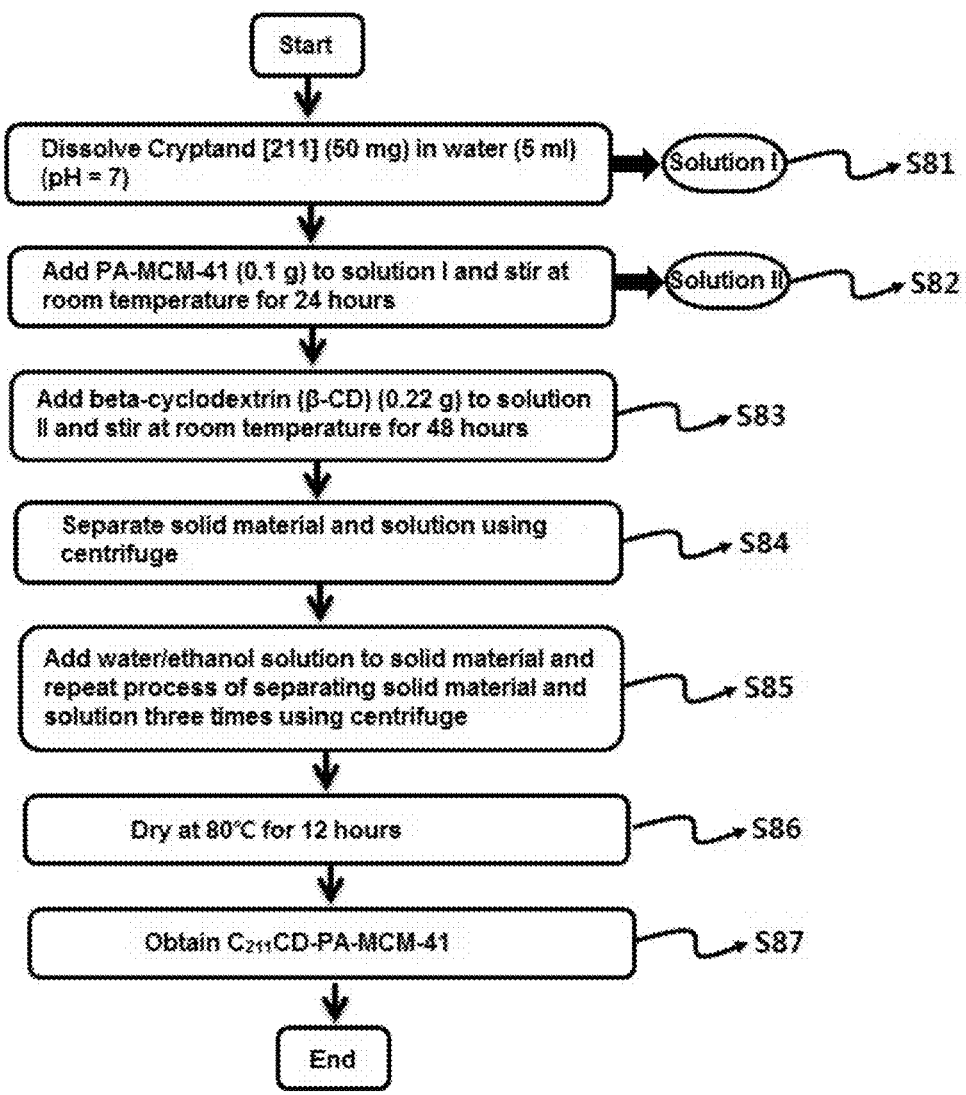
FIG. 8 is a flow chart showing a synthesis process of an organic-inorganic hybrid nanoporous silica material ($C_{211}$CD-PA-MCM-41) according to Example 1.

C. Synthesis of Nanoporous Silica Material ($C_{211}$CD-PA-MCM-41) Having a Closed Pore Form by Incorporating Cryptand in Nano Pores and Using Beta-Cyclodextrin FIG. 8 is flow chart showing a process for synthesizing a nanoporous silica material which is incorporated with cryptand in the nano pores and modified with beta-cyclodextrin according to an exemplary embodiment of the present invention.

A solution I was prepared by dissolving cryptand [211] (50 mg) in water (5 ml) (pH=7) (Step S81). Then, a solution II was prepared by mixing PA-MCM-41 (0.1 g) with the solution I, followed by stirring at room temperature (20° C.) for 24 hours (Step S82). Next, beta-cyclodextrin (0.22 g) was mixed with the solution II and stirred and reacted at room temperature for 48 hours (Step S83). After the reaction, a solid material and a filtrate were separated using a centrifuge (rpm=8000) (Step S84), and the solid material was washed with a water/ethanol solution, and a process for separating the solid material and the filtrate using a centrifuge was repeated three times (Step S85). After washing, the solid material was dried at 80° C. for 12 hours (Step S86) to obtain an organic-inorganic hybrid nanoporous silica material ($C_{211}$CD-PA-MCM-41) (Step S87).

Confirmation and Evaluation of Product Material

FIG. 12 shows x-ray diffraction patterns of the nanoporous silica material (MCM-41) and the nanoporous silica material (PA-MCM-41) surface-modified with the N-[3-(trimethoxysilyl)propyl]aniline.

It could be confirmed that the nanoporous silica material (MCM-41) had four peaks (100, 110, 200, and 210) that were clearly separated. It indicated that the nano pores were well arranged in a hexagonal structure.

In addition, the nanoporous silica material (PA-MCM-41) surface-modified with N-[3-(trimethoxysilyl)propyl]aniline also had four well-separated peaks showing a hexagonal structure, and thus, it could be appreciated that the nano pore arrangement was maintained well even after surface-modification. Here, it could be confirmed that the surface-modified nanoporous silica material (PA-MCM-41) showed a strong x-ray diffraction pattern intensity as compared to that of the nanoporous silica material (MCM-41), and it could be appreciated that this strong x-ray diffraction pattern intensity was resulted from a clear contrast between the pores and the pore walls as the cationic surfactant used as the structure forming template in the pores was removed using the ethanol/hydrochloric acid solution.

Figure 13:
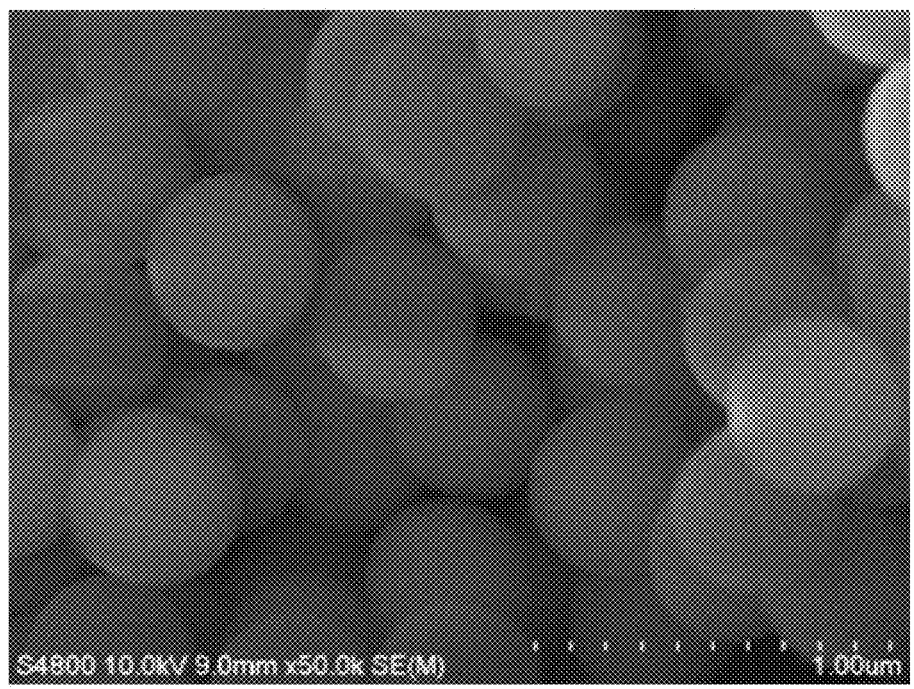
FIG. 13 is a scanning electron micrograph of the surface-modified nanoporous silica material (PA-MCM-41) according to Example 1.

FIG. 13 is a scanning electron microscope (SEM) image showing a particle shape of the surface-modified nanoporous silica material (PA-MCM-41). It could be appreciated that the surface-modified nanoporous silica material had a spherical particle shape and an average particle size of 500 nm.

Figure 14:
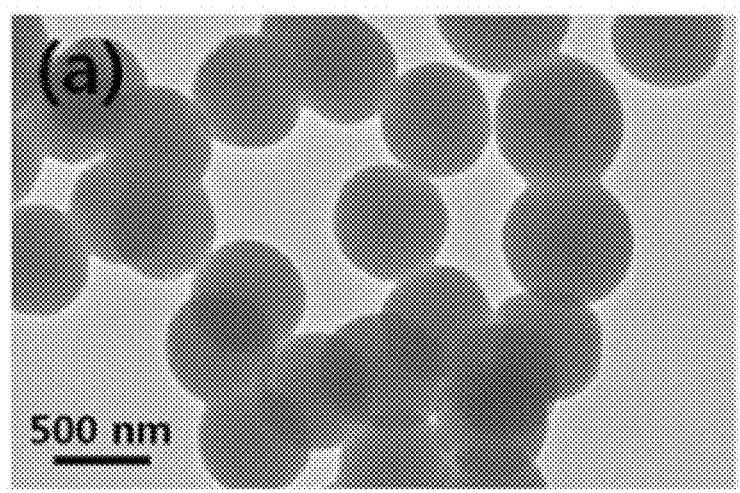
FIG. 14 is transmission electron micrograph images of (a) low magnification of the surface-modified nanoporous silica material (PA-MCM-41) according to Example 1.
Figure 15:
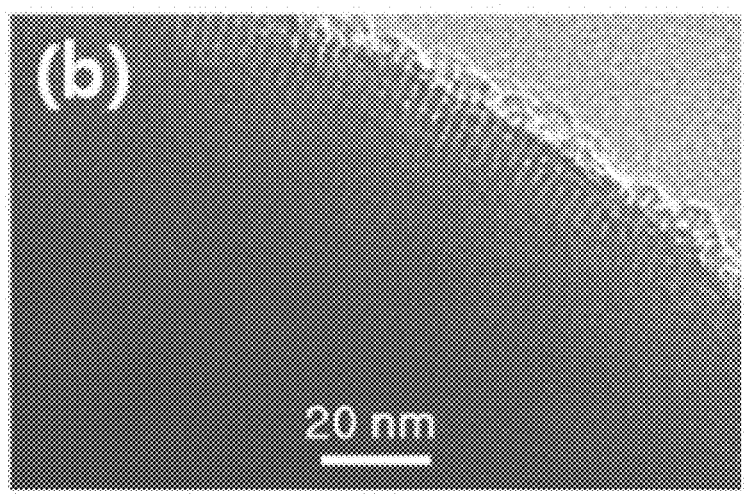
FIG. 15 is a transmission electron micrograph image of (b) high magnification of the surface-modified nanoporous silica material (PA-MCM-41) according to Example 1.
Figure 16:
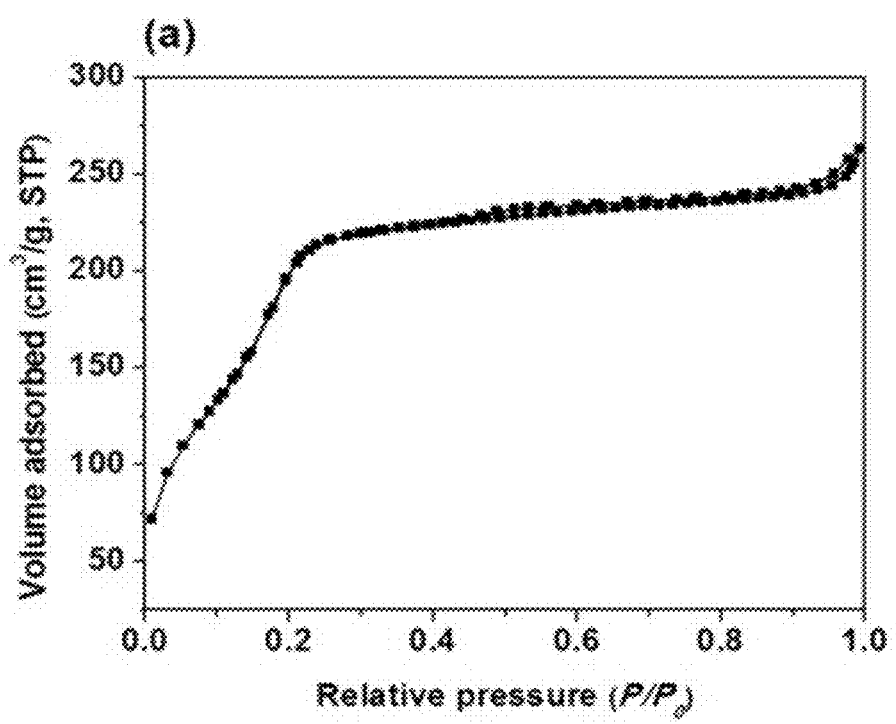
FIG. 16 shows a nitrogen isothermal adsorption/desorption curve of the surface-modified nanoporous silica material (PA-MCM-41) according to Example 1.

FIGS. 14 and 15 are transmission electron microscope images of low magnification and high magnification of the surface-modified nanoporous silica material (PA-MCM-41). It could be appreciated that as shown in FIG. 15, the nano pores were well arranged. This result is consistent with the result of the X-ray diffraction patterns of FIG. 12.

Figure 17:
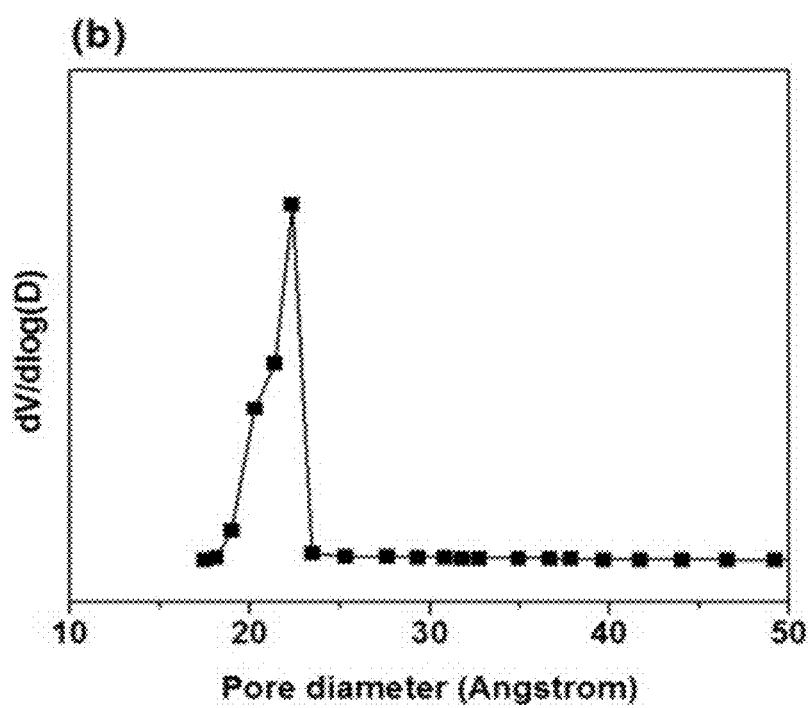
FIG. 17 shows a nanopore distribution (b) of the surface-modified nanoporous silica material (PA-MCM-41) according to Example 1.

FIG. 15 shows a nitrogen isothermal adsorption/desorption curve and nanopore distribution of the surface-modified nanoporous silica material (PA-MCM-41). It could be confirmed that the nitrogen isotherm adsorption/desorption curve had a typical type IV shape shown in the nanoporous material. Here, it could be confirmed that the surface-modified nanoporous silica material (PA-MCM-41) had a surface area of 855 $m^2$/g and an average pore diameter of 2.2 nm, it could be appreciated that the pore size was very uniform as shown in the pore size distribution (FIG. 17). This result is consistent with the result of the transmission electron microscope image of FIG. 15.

Figure 18:
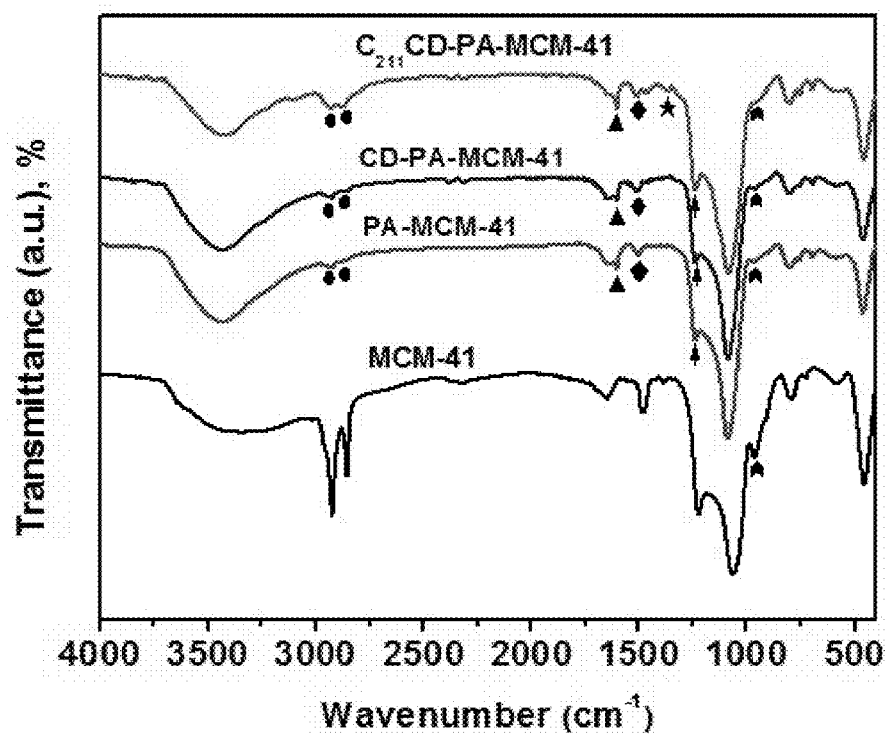
FIG. 18 shows infrared spectra of the nanoporous silica material (MCM-41), the surface-modified nanoporous silica material (PA-MCM-41), an organic-inorganic hybrid nanoporous silica material without containing an organic ligand (CD-PA-MCM-41), and the organic-inorganic hybrid nanoporous silica material ($C_{211}$CD-PA-MCM-41).

FIG. 18 shows infrared spectra of the nanoporous silica material (MCM-41), the surface-modified nanoporous silica material (PA-MCM-41), an organic-inorganic hybrid nanoporous silica material without containing an organic ligand (CD-PA-MCM-41), and the organic-inorganic hybrid nanoporous silica material ($C_{211}$CD-PA-MCM-41) of the present invention. It could be confirmed that in the surface-modified nanoporous silica material (PA-MCM-41), a peak intensity was remarkably reduced at 958 $cm^{-1}$ representing the silanol (Si—OH) group present in the nanoporous silica material (MCM-41). In addition, it could be confirmed that the peak intensity was also remarkably reduced at three peaks of 2921 $cm^{-1}$, 2852 $cm^{-1}$ and 1478 $cm^{-1}$ which were shown by C—H groups present in aliphatic organic molecules. This could be interpreted as a result shown by removing the cationic surfactant present in the pores. On the other hand, it could be confirmed that in the nanoporous silica material (PA-MCM-41) surface-modified with N-[3-(trimethylsilyl)

propyl]aniline group, two peaks around 2920 cm$^{-1}$ and 2850 cm$^{-1}$ representing the C—H groups by N-[3-(trimethoxysilyl)propyl]aniline still remained. In addition, one peak by an aromatic —C=C— bond of N-[3-(trimethoxysilyl)propyl]aniline was shown at 1508 cm$^{-1}$ and one peak by an NH group was shown at 1603 cm$^{-1}$, respectively. As a result, it could be appreciated that the surface of the nanoporous silica material (MCM-41) was successfully modified with N-[3-(trimethoxysilyl)propyl]aniline. The infrared spectrum of the organic-inorganic hybrid nanoporous silica material ($C_{211}$CD-PA-MCM-41) in which the cryptand molecule having high selectivity to metal ions (nickel ions) was incorporated in the nanoporous silica material (PA-MCM-41) surface-modified with N-[3-(trimethoxysilyl)propyl]aniline, and beta-cyclodextrin was introduced as the stopper of the nano pores had a new peak at 1363 cm$^{-1}$. It could be appreciated that this peak was resulted from a —N—$CH_2$— group of the cryptand molecule incorporated in the organic-inorganic hybrid nanoporous silica material ($C_{211}$CD-PA-MCM-41). As a result, it could be appreciated that the cryptand molecule having high selectivity to metal ions (nickel ions) in the pores was well incorporated without loss in the process for synthesizing the organic-inorganic hybrid nanoporous silica material ($C_{211}$CD-PA-MCM-41).

Consequently, as a result of analyzing the organic-inorganic hybrid nanoporous silica material ($C_{211}$CD-PA-MCM-41) prepared by the preparation method according to an exemplary embodiment of the present invention by infrared spectroscopy, it was confirmed that the opening part of nano pores was modified with N-[3-(trimethoxysilyl)propyl]aniline, the beta-cyclodextrin molecule was used as the stopper of the nano pores, and the cryptand having high selectivity to the nickel ions in the pores was well incorporated.

Figure 19:
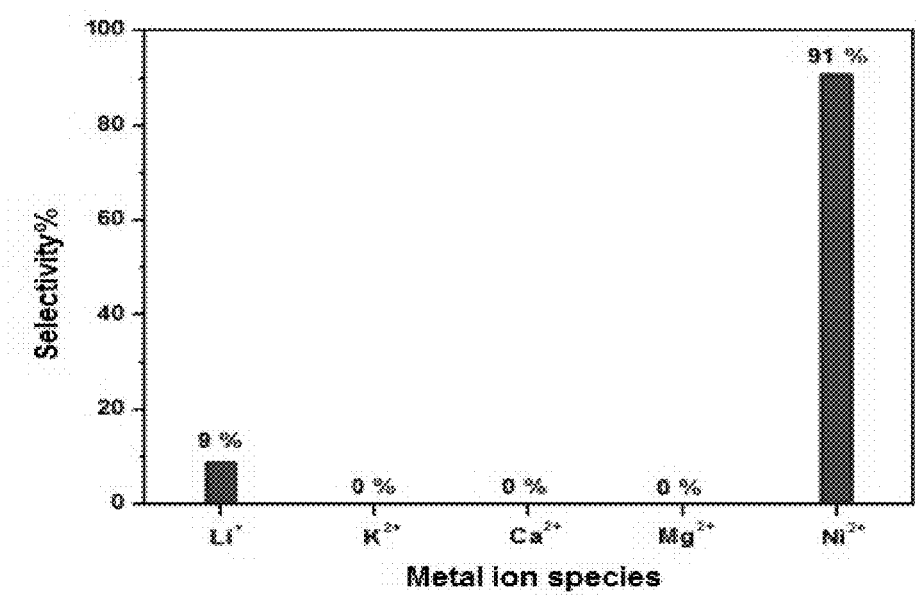
FIG. 19 is a graph showing selectivity to various metal ions in the similar seawater (artificial seawater) using the organic-inorganic hybrid nanoporous silica material ($C_{211}$CD-PA-MCM-41) according to Example 1 as an adsorbent.

FIG. 19 is a graph showing selectivity to various metal ions in a similar seawater (artificial seawater) using the organic-inorganic hybrid nanoporous silica material ($C_{211}$CD-PA-MCM-41) of the present invention as an adsorbent, wherein adsorption results to metal ions were observed by preparing mixed solutions in which various metal ions ($Li^+$, $Mg^{2+}$, $Ca^{2+}$, $K^-$ and $Ni^{2+}$) were dissolved in a concentration of $5 \times 10^{-4}$ M, respectively, by using similar seawater (artificial seawater, see composition in FIG. 11) as a solvent, followed by treatment with the adsorbent containing the organic-inorganic hybrid nanoporous silica material ($C_{211}$CD-PA-MCM-41) at room temperature (20° C.) for 24 hours.

As shown in FIG. 19, it could be confirmed that a low selectivity of 9% to lithium ions ($Li^+$) was shown, and adsorption properties to $Mg^{2+}$, $Ca^{2+}$, and $K^-$ ions were not shown, but significantly high selectivity of 91% to nickel ions ($Ni^{2+}$) as shown.

Figure 20:
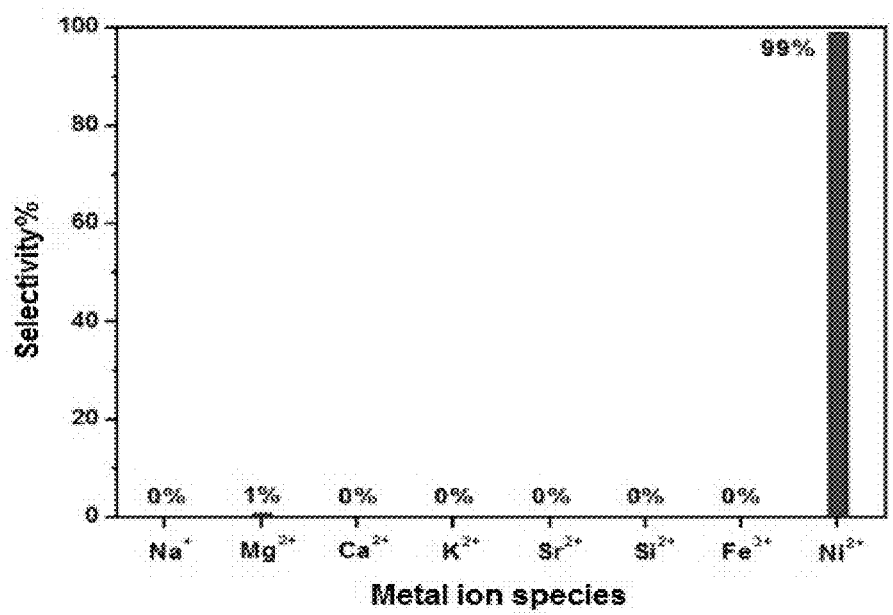
FIG. 20 is a graph showing selectivity to various metal ions in the aqueous solution using the organic-inorganic hybrid nanoporous silica material ($C_{211}$CD-PA-MCM-41) according to Example 1 as an adsorbent.

FIG. 20 is a graph showing selectivity to various metal ions in an aqueous solution using the organic-inorganic hybrid nanoporous silica material ($C_{211}$CD-PA-MCM-41) of the present invention as an adsorbent, wherein adsorption results to metal ions were observed by preparing mixed solutions in which various metal ions ($Na^+$, $Mg^{2+}$, $Ca^{2+}$, $K^-$, $Sr^{2+}$, $Si^{4+}$, $Fe^{3+}$, and $Ni^{2+}$) were dissolved in a concentration of $5 \times 10^{-4}$ M, respectively, by using water as a solvent, followed by treatment with the adsorbent containing the organic-inorganic hybrid nanoporous silica material ($C_{211}$CD-PA-MCM-41) at room temperature (20° C.) for 24 hours.

As shown in FIG. 20, it could be confirmed that a low selectivity of 1% to magnesium ions ($Mg^{2+}$) was shown, and adsorption properties to $Na^+$, $Ca^{2+}$, $K^-$, $Sr^{2+}$, $Si^{4+}$, and $Fe^{3+}$ ions were not shown, but significantly high selectivity of 99% to nickel ions ($Ni^{2+}$) was shown.

Example 2

Adsorption of Metal Ions in Aqueous Solution Using Organic-Inorganic Hybrid Nanoporous Silica Material ($C_{211}$CD-PA-MCM-41)

Figure 9:
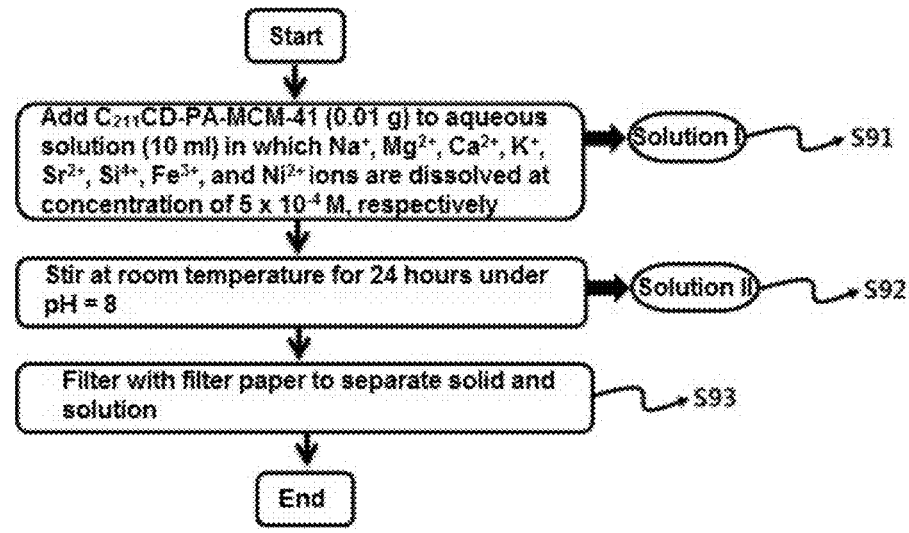
FIG. 9 is a flow chart showing a process for selectively adsorbing metal ions in an aqueous solution using the organic-inorganic hybrid nanoporous silica material ($C_{211}$CD-PA-MCM-41) according to Example 1.

FIG. 9 is a flow chart showing an adsorption process to various metal ions ($Na^+$, $Mg^{2+}$, $Ca^{2+}$, $K^-$, $Sr^{2+}$, $Si^{4+}$, $Fe^{3+}$, and $Ni^{2+}$) in an aqueous solution using the organic-inorganic hybrid nanoporous silica material ($C_{211}$CD-PA-MCM-41) prepared by an exemplary embodiment of the present invention.

First, the organic-inorganic hybrid nanoporous silica material ($C_{211}$CD-PA-MCM-41) (0.01 g) was added to the aqueous solution (10 ml) in which $Na^+$, $Mg^{2+}$, $Ca^{2+}$, $K^-$, $Sr^{2+}$, $Si^{4+}$, $Fe^{3+}$, and $Ni^{2+}$ ions are dissolved at a concentration of $5 \times 10^{-4}$ M, respectively (FIG. 9—Step S91). Then, the reaction solution was stirred and reacted at room temperature for 24 hours under pH=8 (FIG. 9—Step S92). After the reaction, the reaction solution was filtered with filter paper to separate a solid and a solution (FIG. 9—Step S93).

Example 3

Adsorption of Metal Ions in Similar Seawater (Artificial Seawater) Using Organic-Inorganic Hybrid Nanoporous Silica Material ($C_{211}$CD-PA-MCM-41)

Figure 10:
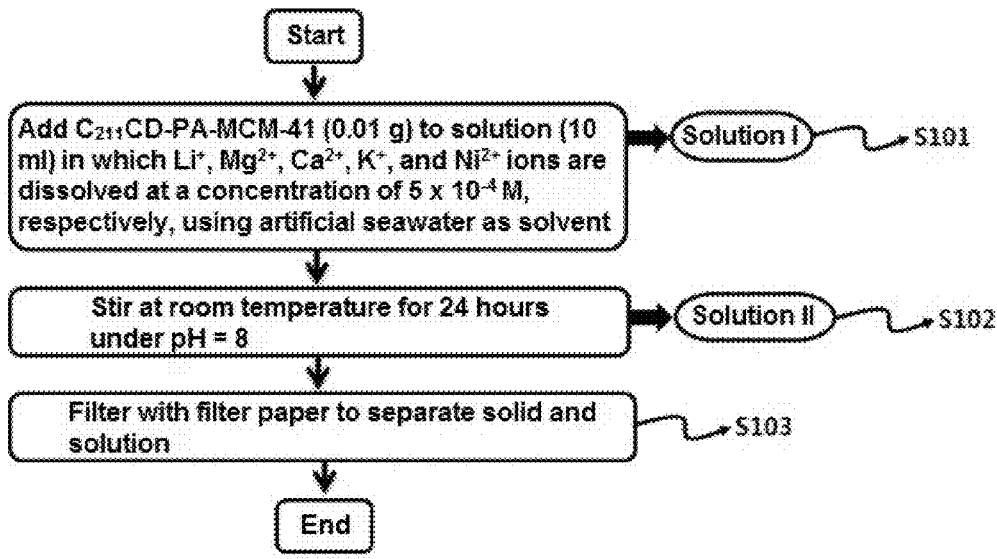
FIG. 10 is a flow chart showing a process for selectively adsorbing metal ions in similar seawater (artificial seawater) using the organic-inorganic hybrid nanoporous silica material ($C_{211}$CD-PA-MCM-41) according to Example 1.

FIG. 10 is a flow chart showing an adsorption process to various metal ions ($Li^+$, $Mg^{2+}$, $Ca^{2+}$, $K^-$, and $Ni^{2+}$) in similar seawater (artificial seawater, see composition in FIG. 11) using the organic-inorganic hybrid nanoporous silica material ($C_{211}$CD-PA-MCM-41) prepared by an exemplary embodiment of the present invention.

First, the organic-inorganic hybrid nanoporous silica material ($C_{211}$CD-PA-MCM-41) (0.01 g) was added to the similar seawater (artificial seawater) (10 ml) in which $Li^+$, concentration of $5 \times 10^{-4}$ M, respectively (FIG. 10—Step S101). Then, the reaction solution was stirred and reacted at room temperature for 24 hours under pH=8 (FIG. 10—Step S102). After the reaction, the reaction solution was filtered with filter paper to separate a solid and a solution (Step S103).

Although the present invention is described with reference to preferable exemplary embodiments, it is understood by those skilled in the art that various changes or modification may be made without departing from technical spirit and scope of the invention. Therefore, the scope of the present invention should not be limited to the above-described exemplary embodiments, but should be determined by the following claims.

The invention claimed is:

1. An organic-inorganic hybrid nanoporous silica material for adsorbing metal ions comprising:
    an organic ligand capable of adsorbing metal ions incorporated in pores,
    wherein the organic-inorganic hybrid nanoporous silica material has a closed pore form by capturing a functionalized compound in a nanoporous silica material, which is surface-modified with a functionalized silane compound, using a cyclic molecule.

2. The organic-inorganic hybrid nanoporous silica material of claim 1, wherein the cyclic molecule is cyclodextrin, crown ether, cyclopropane pseudorotaxane, bistable rotaxane, cucurbit uril or a derivative thereof.

3. The organic-inorganic hybrid nanoporous silica material of claim 1, wherein the organic ligand is cryptand, crown ether, porphyrin, or a derivative thereof.

4. The organic-inorganic hybrid nanoporous silica material of claim 1, wherein the metal ion is at least one selected from the group consisting of a lithium ion, an iron ion, a copper ion, a cobalt ion, and a nickel ion.

5. The organic-inorganic hybrid nanoporous silica material of claim 4, wherein the metal ion is the nickel ion ($Ni^{2+}$).

6. The organic-inorganic hybrid nanoporous silica material of claim 1, wherein the organic-inorganic hybrid nanoporous silica material has a pore arrangement of a hexagonal structure, a cubic structure, a layered structure or a disordered structure.

7. The organic-inorganic hybrid nanoporous silica material of claim 6, wherein the organic-inorganic hybrid nanoporous silica material having the pore arrangement has an average pore diameter of 2 to 30 nm and a surface area of 500 to 1000 $m^2/g$.

8. An adsorbent having selective adsorptivity to metal ions, comprising the organic-inorganic hybrid nanoporous silica material of claim 1.

9. The adsorbent of claim 8, wherein the adsorbent selectively adsorbs and separates nickel ions (Ni').

10. A method for preparing an organic-inorganic hybrid nanoporous silica material comprising:
   surface-modifying a pore wall surface of a nanoporous silica material with a functionalized silane compound; and
   supporting an organic ligand capable of adsorbing metal ions in pores of the surface-modified nanoporous silica material, and introducing a cyclic molecule to form a closed pore form.

11. The method of claim 10, wherein the functionalized silane compound is mixed in an amount of 10 to 80 parts by weight based on 100 parts by weight of the nanoporous silica material.

12. The method of claim 11, wherein the surface-modifying is performed at a temperature ranging from 80 to 150° C.

13. The method of claim 12, wherein the organic-inorganic hybrid nanoporous silica material has a surface area of 500 to 1000 $m^2/g$, and an average pore diameter of 2 to 30 nm.

14. The method of claim 13, wherein the cyclic molecule is mixed in an amount of 200 to 300 parts by weight based on 100 parts by weight of the surface-modified nanoporous silica material so that an opening part of the pores exposed on a surface has a closed pore form by the cyclic molecule.

* * * * *